(12) United States Patent
Takano et al.

(10) Patent No.: US 6,272,858 B1
(45) Date of Patent: Aug. 14, 2001

(54) MASTER CYLINDER

(75) Inventors: Eiichi Takano; Takato Ogiwara; Hiromi Ando, all of Yamanashi-ken (JP)

(73) Assignee: Tokico Ltd., Kanagawa-Ken (JP)

( * ) Notice: Subject to any disclaimer, the term of this patent is extended or adjusted under 35 U.S.C. 154(b) by 0 days.

(21) Appl. No.: 09/396,421

(22) Filed: Sep. 15, 1999

(30) Foreign Application Priority Data

Sep. 30, 1998 (JP) ................................................. 10-294502

(51) Int. Cl.⁷ ....................................................... F15B 7/08
(52) U.S. Cl. .................................................................. 60/588
(58) Field of Search ................................................... 60/588

(56) References Cited

U.S. PATENT DOCUMENTS

| | | | |
|---|---|---|---|
| 5,878,575 | 3/1999 | Kreh et al. | 60/588 |
| 5,953,916 * | 9/1999 | Wurl et al. | 60/588 |

FOREIGN PATENT DOCUMENTS

| | | | |
|---|---|---|---|
| 34 31 115 | 3/1986 | (DE) . | |
| 195 20 682 | 8/1996 | (DE) . | |
| 195 23 217 | 1/1997 | (DE) . | |
| 2645992 * | 4/1997 | (DE) | 60/588 |
| 96/23683 | 8/1996 | (WO) . | |

* cited by examiner

*Primary Examiner*—F. Daniel Lopez
(74) *Attorney, Agent, or Firm*—Wenderoth, Lind & Ponack L.L.P.

(57) ABSTRACT

A master cylinder includes a cylinder, a piston slidably provided in the cylinder, an annular cup seal held on an inner circumferential surface of the cylinder, and a relief port formed in the piston. The piston and the cylinder define a pressure chamber for generating fluid pressure in front of the piston, and the cylinder and an outer circumferential surface of the piston define a fluid supply chamber which communicates with a reservoir. The cup seal is adapted to slide against the outer circumferential surface of the piston to separate the fluid supply chamber from the pressure chamber. The relief port provides communication between the pressure chamber and the fluid supply chamber. A control taper surface is formed on the outer circumferential surface of the piston rearwardly from the relief port. The control taper surface is tapered toward the front of the piston and is capable of abutting against an inner circumferential surface of the cup seal.

9 Claims, 6 Drawing Sheets

MASTER CYLINDER

BACKGROUND OF THE INVENTION

The present invention relates to a master cylinder which generates a fluid pressure for operating a brake apparatus.

As a conventional master cylinder, there can be mentioned a master cylinder disclosed in Unexamined Japanese Patent Application Public Disclosure No. 2-136363. This master cylinder comprises a cylinder, a piston slidably provided in the cylinder, an annular cup seal held on an inner circumferential surface of the cylinder, and a relief port formed in the piston. The piston and the cylinder define a pressure chamber for generating a fluid pressure on a side to which the piston advances. The cylinder and an outer circumferential surface of the piston define a fluid supply chamber which communicates with a reservoir. The cup seal is adapted to be slid against by the straight outer circumferential surface of the piston to separate the fluid supply chamber from the pressure chamber. The relief port has two openings. One of the two openings is open on the outer circumferential surface of the piston, while the other opening is always open to the pressure chamber. Thus, the relief port is capable of providing communication between the pressure chamber and the fluid supply chamber.

In this master cylinder, the piston needs to move (or advance) a large distance (invalid stroke) from its initial position to the position where the relief port is closed by the cup seal. Due to limitation on the magnitude of the invalid stroke, the relief port of the piston at the initial position cannot be displaced sufficiently rearwardly from a rear end portion of the cup seal, making it difficult to communicate the relief port with the fluid supply chamber to a satisfactorily large degree.

SUMMARY OF THE INVENTION

Therefore, it is an object of the present invention to provide a master cylinder which is advantageously used in combination with a brake control apparatus, without increasing the invalid stroke of a piston.

According to the present invention, there is provided a master cylinder comprising a cylinder, a piston slidably provided in the cylinder, an annular cup seal held on an inner circumferential surface of the cylinder, and a relief port formed in the piston. The piston and the cylinder define a pressure chamber for generating a fluid pressure in front of the piston, and the cylinder and an outer circumferential surface of the piston define a fluid supply chamber which communicates with a reservoir. The cup seal is adapted to slide against the outer circumferential surface of the piston to separate the fluid supply chamber from the pressure chamber. The relief port has two openings, one of the two openings being open on the outer circumferential surface of the piston and the other opening being always open to the pressure chamber, so as to be capable of providing communication between the pressure chamber and the fluid supply chamber. A control taper surface is formed on the outer circumferential surface of the piston rearwardly from the opening of the relief port on the outer circumferential surface of the piston. The control taper surface is tapered toward the front of the piston and is capable of abutting against an inner circumferential surface of the cup seal.

As mentioned above, in the master cylinder of the present invention, a control taper surface tapered toward the front of the piston is formed on the outer circumferential surface of the piston rearwardly from the opening of the relief port, so as to be capable of abutting against the inner circumferential surface of the cup seal. By this arrangement, when the piston advances, the control taper surface abuts against the inner circumferential surface of a rear end portion of the cup seal, so as to compress the cup seal along the control taper surface to increase an inner diameter of the cup seal. When the cup seal is compressed along the control taper surface, a surface pressure between the cup seal and the piston becomes locally high. Therefore, it has become possible to seal off the pressure chamber from the fluid supply chamber by generating a sufficiently high surface pressure on the rear end portion of the cup seal and pressurize, by means of the piston, a brake fluid in the pressure chamber to thereby generate a fluid pressure.

Since the sufficiently high pressure for sealing off the pressure chamber from the fluid supply chamber can be generated by the control taper surface on the rear end portion of the cup seal, it is sufficient only if the opening of the relief port on the outer circumferential surface of the piston is positioned in front of the control taper surface. Consequently, the relief port of the piston at its initial position can be positioned rearwardly from the cup seal without increasing the invalid stroke, so that a sufficient degree of opening of the relief port relative to the fluid supply chamber (or the amount of communication therebetween) can be satisfactorily secured.

In the above-mentioned master cylinder, a recess may be formed on the outer circumferential surface of the piston so that the opening of the relief port on the outer circumferential surface of the piston is formed in the recess and the control taper surface is formed in the recess rearwardly from the opening of the relief port.

When the control taper surface is formed in the recess rearwardly from the opening of the relief port, the cross-sectional area of a flow path in the fluid supply chamber on a side of the relief port becomes large.

The foregoing and other objects, features and advantages of the present invention will be apparent from the following detailed description and appended claims taken in connection with the accompanying drawings.

DETAILED DESCRIPTION OF THE INVENTION

Before explaining an embodiment of the present invention, for easy understanding of the present invention, explanation is made in detail of the above-mentioned master cylinder of Unexamined Japanese Patent Application Public Disclosure No. 2-136363.

Figure 12:
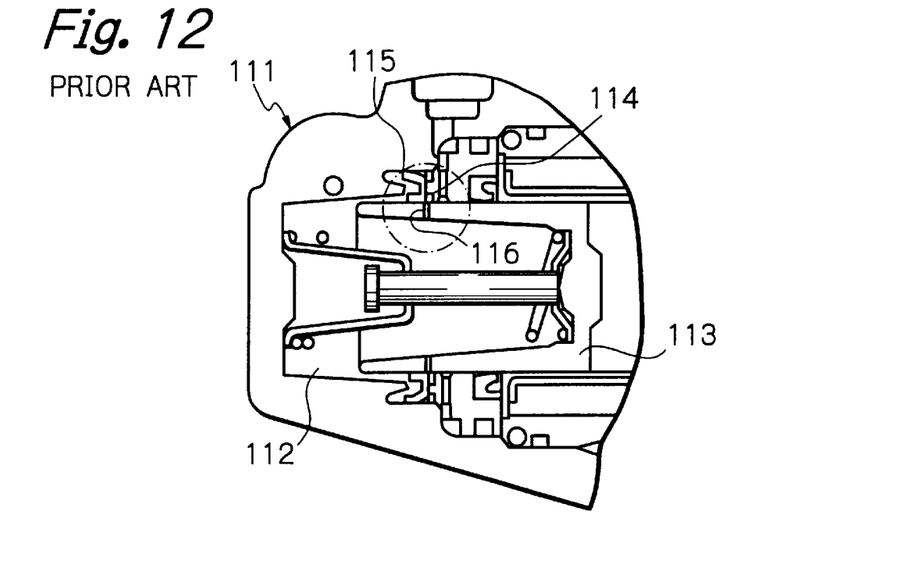
FIG. 12 is a cross-sectional view of a conventional master cylinder.
Figure 13:
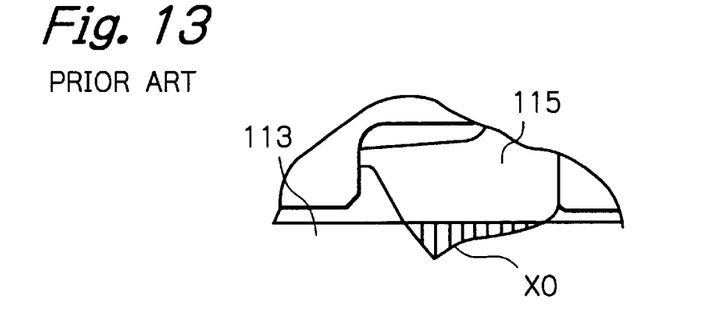
FIG. 13 is an enlarged cross-sectional view of an essential part of the master cylinder of FIG. 12, showing a surface pressure distribution condition on a cup seal.

As shown in FIG. 12, this master cylinder comprises a cylinder 111, a piston 113 slidably provided in the cylinder 111, an annular cup seal 115 held on an inner circumferential surface of the cylinder 111, and a relief port 116 formed in the piston 113. The piston 113 and the cylinder 111 define a pressure chamber 112 for generating a fluid pressure on a side to which the piston advances (the left side in FIG. 2). The cylinder 111 and an outer circumferential surface of the piston 113 define a fluid supply chamber 114 communicating with a reservoir (not shown). The cup seal 115 is adapted to slide against the straight outer circumferential surface of the piston 113 to separate the fluid supply chamber 114 from the pressure chamber 112. The relief port 116 has two openings. One of the two openings is open on the outer circumferential surface of the piston 113. The other opening is always open to the pressure chamber 112. Thus, the relief port 116 is capable of providing communication between the pressure chamber 112 and the fluid supply chamber 114. In this master cylinder, as indicated by X0 in FIG. 13, a surface pressure between the cup seal 115 and the piston 113 peaks on the front side as viewed in a direction of movement of the piston 113. As indicated by solid lines in FIG. 14, in an initial state of the piston 113 in which the piston 113 is located at its initial position farthest away from the pressure chamber 112, the relief port 116 provides communication between the pressure chamber 112 and the fluid supply chamber 114. When the piston 113 advances to a side of the pressure chamber 112 and the relief port 116 has passed, as shown by two-dot chain lines in FIG. 14, a predetermined position in the vicinity of the position of the peak surface pressure on the cup seal 115, the pressure chamber 112 is completely sealed off from the fluid supply chamber 114, so that the piston 113 pressurizes a brake fluid in the pressure chamber 112, to thereby generate the fluid pressure.

Figure 14:
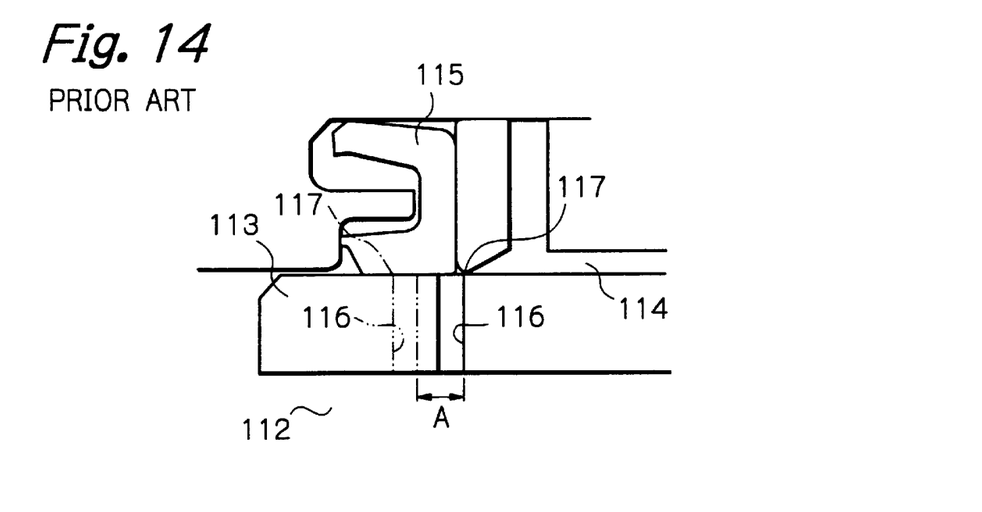
FIG. 14 is an enlarged cross-sectional view of an essential part of the master cylinder of FIG. 12.

In the master cylinder, a so-called invalid stroke A of the piston 113 from the initial position to the position for the start of generation of the fluid pressure is determined to have a value within a certain range (A=about 1.2 mm to 1.5 mm), from the viewpoint of braking feel in a vehicle. Therefore, the initial position of the piston 113 must be set to a position away from the predetermined position in the vicinity of the position of the peak surface pressure on the cup seal 115 by a distance corresponding to the invalid stroke A. When the initial position of the piston 113 is set in the above-mentioned manner, in the above-mentioned master cylinder, a large part of an opening 117 of the relief port 116 of the piston 113 is closed by a rear end portion of the cup seal 115, so that the degree of opening of the relief port 116 relative to the fluid supply chamber 114 (or the amount of communication therebetween) is unsatisfactory. Therefore, when the master cylinder is combined with a brake control apparatus such as a traction control apparatus and the brake fluid is positively suctioned through a pipe communicating with the pressure chamber for traction control, it is difficult for the brake fluid to flow from the reservoir to the pressure chamber, thus rendering the master cylinder unsuitable for use with the brake control apparatus.

Hereinbelow, a master cylinder according to an embodiment of the present invention is described, with reference to FIGS. 1 to 11.

Figure 1:
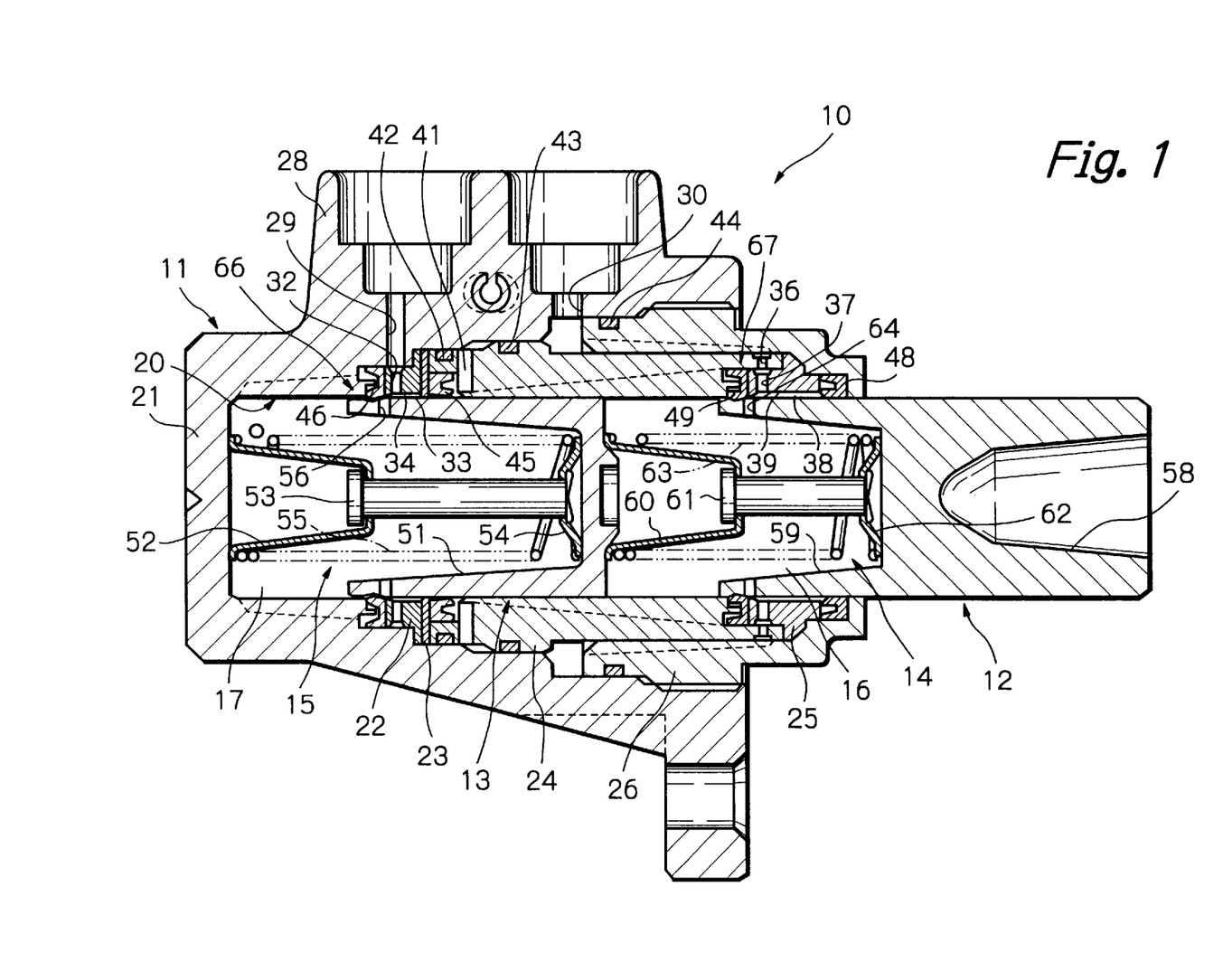
FIG. 1 shows an arrangement of a master cylinder according to an embodiment of the present invention.

FIG. 1 shows an arrangement of a master cylinder 10. In FIG. 1, reference numeral 11 denotes a cylinder in a generally cylindrical form. The cylinder 11 has an open end portion and has a closed end portion opposite to the open end portion. A primary piston 12 is slidably provided in the cylinder 11 on a side of the open end portion (on the right side in FIG. 1). A secondary piston 13 is slidably provided in the cylinder 11 on a side of the closed end portion (on the left side in FIG. 1) opposite to the primary piston 12.

Reference numeral 14 denotes an initial clearance maintaining mechanism provided between the primary piston 12 and the secondary piston 13. The initial clearance maintaining mechanism 14 determines a clearance between the primary piston 12 and the secondary piston 13 in an initial state in which no input is supplied from a brake pedal (from the right side in FIG. 1), although the brake pedal is not shown. Hereinafter, the position of each of respective parts of the primary piston 12 and the secondary piston 13 in the initial state is referred to as "the initial position". Reference numeral 15 denotes an initial clearance maintaining mechanism provided between the secondary piston 13 and the closed end portion of the cylinder 11. The initial clearance maintaining mechanism 15 determines a clearance between the secondary piston 13 and the closed end portion of the cylinder 11 in the initial state in which no input is supplied from the brake pedal. The primary piston 12, the secondary piston 13 and the cylinder 11 define a primary pressure chamber 16. The secondary piston 13 and the closed end portion of the cylinder 11 define a secondary pressure chamber 17.

In the master cylinder 10, a stepping force applied to the brake pedal is boosted by, for example, a booster, and is applied to the primary piston 12 on a side remote from the secondary piston 13. Consequently, the primary piston 12 advances to a side of the primary pressure chamber 16 (to the left side in the drawings) and the secondary piston 13 advances to a side of the secondary pressure chamber 17 (to the left side in the drawings). When the stepping force has been released, the primary piston 12 and the secondary piston 13 move to a side opposite to the primary pressure chamber 16 and the secondary pressure chamber 17, respectively (to the right side in the drawings). Hereinafter, "front" refers to a side to which the primary piston 12 and the secondary piston 13 move when the stepping force is applied, and "rear" refers to a side to which the primary piston 12 and the secondary piston 13 move when the stepping force has been released.

The cylinder 11 comprises: a first member 21 providing a front portion of a cylinder bore 20 in which the primary piston 12 and the secondary piston 13 are provided; a second member 22 in a generally annular form which is fit in the first member 21 most closely to a closed end of the first member 21 so as to have a coaxial relationship with the cylinder bore 20; a third member 23 in a form of an annular plate which is fit in the first member 21 adjacent to a rear side of the second member 22 so as to have a coaxial relationship with the cylinder bore 20; a fourth member 24 in a generally cylindrical form which is fit in the first member 21 adjacent to a rear side of the third member 23 and which provides an intermediate portion of the cylinder bore 20; a fifth member 25 in a generally cylindrical form which is provided on a rear side of the fourth member 24 so as to have a coaxial relationship with the cylinder bore 20; and a sixth member 26 in a generally cylindrical form which is threadably engaged with an interior of the first member 21 while being provided outside the fourth member 24 and the fifth member 25 and which provides the rearmost portion of the cylinder bore 20.

In the first member 21, a mounting portion 28 is formed for mounting of a reservoir (not shown). Two fluid passages 29 and 30 are formed in the mounting portion 28. The fluid passages 29 and 30 are arranged in a longitudinal direction of the cylinder. When the reservoir is mounted, the fluid passages 29 and 30 individually communicate with the reservoir.

The front fluid passage 29 always communicates with a fluid passage 32 which radially extends through the second member 22. An annular stepped portion 33 is formed on an inner circumferential surface of the second member 22. The stepped portion 33 has a diameter which is larger than an outer diameter of the secondary piston 13. Thus, an annular fluid supply chamber 34 is formed by the stepped portion 33 of the second member 22, an outer circumferential surface of the secondary piston 13 and the third member 23. The fluid passage 32 opens on an inner circumferential side of the stepped portion 33, so that the fluid passage 32 always communicates with the fluid supply chamber 34.

The other fluid passage 30 always communicates with a fluid passage 36 which radially extends through the fourth member 24. The fluid passage 36 always communicates with a fluid passage 37 which radially extends through the fifth member 25. An annular stepped portion 38 is formed on an inner circumferential surface of the fifth member 25. The stepped portion 38 has a diameter which is larger than an outer diameter of the primary piston 12. Thus, an annular fluid supply chamber 39 is formed by the stepped portion 38 of the fifth member 25 and an outer circumferential surface of the primary piston 12. The fluid passage 37 opens on an inner circumferential side of the stepped portion 38, so that the fluid passage 37 always communicates with the fluid supply chamber 39.

A fluid chamber 41 is formed in the fourth member 24. The fluid chamber 41 communicates with the primary pressure chamber 16 through a gap between the secondary piston 13 and the fourth member 24. A front portion of the fourth member 24 includes annular seal members 42 and 43 provided on an outer circumferential surface thereof. The seal members 42 and 43 prevent the fluid chamber 41 from communicating with the fluid passage 29 and the fluid passage 30 through a gap between the first member 21 and the fourth member 24.

The sixth member 26 includes an annular seal member 44 provided on an outer circumferential surface thereof. The seal member 44 prevents the fluid passage 30 from communicating with the outside through a gap between the first member 21 and the sixth member 26.

An annular seal member 45 is provided within a space defined by the fourth member 24, the third member 23 and the secondary piston 13. The seal member 45 has a U-shaped cross-section taken on a plane containing the axis thereof. The seal member 45 prevents communication between the fluid supply chamber 34 and the fluid chamber 41 through the gap between the secondary piston 13 and the fourth member 24. An opening in the cross-section of the seal member 45 is positioned on a side of the fluid chamber 41.

An annular cup seal 46 having a U-shaped cross-section taken on a plane containing the axis thereof is held within a space defined by an inner circumferential surface of the first member 21, the second member 22 and the secondary piston 13. The cup seal 46 is adapted to slide against the outer circumferential surface of the secondary piston 13 so as to prevent communication between the fluid supply chamber 34 and the secondary pressure chamber 17 through a gap between the secondary piston 13 and the first member 21, that is, to separate the fluid supply chamber 34 from the secondary pressure chamber 17. An opening in the cross-section of the cup seal 46 is positioned on a side of the secondary pressure chamber 17.

An annular seal member 48 is provided within a space defined by the sixth member 26, the fifth member 25 and the primary piston 12. The seal member 48 has a U-shaped cross-section taken on a plane containing the axis thereof. The seal member 48 prevents the fluid supply chamber 39 from communicating with the outside through a gap between the primary piston 12 and the sixth member 26. An opening in the cross-section of the seal member 48 is positioned on a side of the fluid supply chamber 39.

An annular cup seal 49 having a U-shaped cross-section taken on a plane containing the axis thereof is held within a space defined by an inner circumferential surface of the fourth member 24, the fifth member 25 and the primary piston 12. The cup seal 49 is adapted to slide against the outer circumferential surface of the primary piston 12 so as to prevent communication between the fluid supply chamber 39 and the primary pressure chamber 16 through a gap between the primary piston 12 and the fourth member 24, that is, to separate the fluid supply chamber 39 from the primary pressure chamber 16. An opening in the cross-section of the cup seal 49 is positioned on a side of the primary pressure chamber 16.

A bore 51 is formed axially at a front portion of the secondary piston 13. The initial clearance maintaining mechanism 15 is provided in the bore 51.

The initial clearance maintaining mechanism 15 comprises: a retainer 52 abutting against the closed end portion of the cylinder 11; a connecting rod 53 slidably provided in the retainer 52 on a side of the secondary piston 13 so as to be moved toward the secondary piston 13 by a predetermined limited amount; a retainer 54 fixed to the connecting rod 53 on a side of the secondary piston 13 and abutting against a bottom wall of the bore 51 of the secondary piston 13; and a spring 55 biasing the retainer 52 and the retainer 54 in opposite directions relative to each other. When no input is supplied from the primary piston 12 to the secondary piston 13, due to the effect of the biasing force of the spring 55, the retainer 52 and the retainer 54 are spaced apart from each other by a distance determined by the connecting rod 53 as a limit. The clearance between the secondary piston 13 and the closed end portion of the cylinder 11 in this state is set to have a predetermined value.

A relief port 56 is formed in the secondary piston 13 in the vicinity of a front end portion thereof. The relief port 56 extends radially from the bore 51 to the outer circumferential surface of the secondary piston 13 to be always open to the secondary pressure chamber 17. Further, the relief port 56 is capable of communicating the secondary pressure chamber 17 with the fluid supply chamber 34, depending on the position of the secondary piston 13.

A bore 58 is formed axially at a rear portion of the primary piston 12. An output shaft of the booster (not shown) is received in the bore 58. The stepping force applied to the brake pedal is boosted by the booster, and is applied to the primary piston 12 through the output shaft.

A bore 59 is formed axially at a front portion of the primary piston 12. The initial clearance maintaining mechanism 14 is provided in the bore 59.

The initial clearance maintaining mechanism 14 comprises: a retainer 60 abutting against a rear side of the secondary piston 13; a connecting rod 61 slidably provided in the retainer 60 on a side of the primary piston 12 so as to be moved toward the primary piston 12 by a predetermined limited amount; a retainer 62 fixed to the connecting rod 61 on a side of the primary piston 12 and abutting against a bottom wall of the bore 59 of the primary piston 12; and a spring 63 biasing the retainer 60 and the retainer 62 in opposite directions relative to each other. When no input is supplied from the brake pedal to the primary piston 12, due to the effect of the biasing force of the spring 63, the retainer 60 and the retainer 62 are spaced apart from each other by a distance determined by the connecting rod 61 as a limit. The clearance between the primary piston 12 and the secondary piston 13 in this state is set to have a predetermined value.

Thus, the initial positions of the primary piston 12 and the secondary piston 13 are set to predetermined positions.

A relief port 64 is formed in the primary piston 12 in the vicinity of a front end portion thereof. The relief port 64 extends radially from the bore 59 to the outer circumferential surface of the primary piston 12 to be always open to the primary pressure chamber 16. Further, the relief port 64 is capable of communicating the primary pressure chamber 16 with the fluid supply chamber 39, depending on the position of the primary piston 12.

A communication switching portion 66 including the cup seal 46 is provided in the vicinity of the relief port 56 of the secondary piston 13. A communication switching portion 67 including the cup seal 49, which is similar to the communication switching portion 66, is provided in the vicinity of the relief port 64 of the primary piston 12.

Hereinbelow, the communication switching portion 66 in the vicinity of the relief port 56 of the secondary piston 13 is taken as an example and explained, with reference to FIG. 2.

A large-diameter bore 69 having a diameter larger than that of the cylinder bore 20 and having a coaxial relationship with the cylinder bore 20 is formed on an inner circumferential surface of a front portion of the first member 21. An annular protrusion 70 is formed to extend axially and rearwardly from a bottom wall of the large-diameter bore 69. A bottom surface 71 is positioned on a a side of an outer circumferential surface of the first member 21 relative to the protrusion 70, and a bottom surface 72 is positioned on a side of the inner circumferential surface of the first member 21 relative to the protrusion 70. It should be noted that the bottom surface 71 is located toward the front of the cylinder 11 relative to the bottom surface 72.

The second member 22 is provided in the large-diameter bore 69 of the first member 21. The cup seal 46 is held between the first member 21 and the second member 22.

The cup seal 46 comprises a bottom portion 74 generally in a form of an annular plate, an annular inner lip portion 75 protruding from the bottom portion 74 in one direction on a side of the inner circumferential surface of the bottom portion 74, and an annular outer lip portion 76 protruding from the bottom portion 74 in the same direction as that of the inner lip portion 75 on a side of the outer circumferential surface of the bottom portion 74. In the cup seal 46, the inner lip portion 75 is slightly inclined so as to have a diameter decreasing toward a protruding end thereof in a free state in which no external force is applied, and the outer lip portion 76 is slightly inclined so as to have a diameter increasing toward a protruding end thereof in the free state. More specifically, the inner lip portion 75 has an inner circumferential slide-contact surface 77 which is slightly inclined so as to have a diameter decreasing toward the protruding end of the inner lip portion 75, and also has a chamfered surface 78 continuous with the slide-contact surface 77 on a side of the protruding end of the inner lip portion 75. The chamfered surface 78 is slightly inclined so as to have a diameter increasing toward the protruding end of the inner lip portion 75.

The cup seal 46 is held between the first member 21 and the second member 22, such that the bottom portion 74 abuts against the second member 22 and the protrusion 70 of the first member 21 is positioned between the inner lip portion 75 and the outer lip portion 76.

A front portion of the stepped portion 33 on the inner circumferential surface of the second member 22 includes an inclined surface 80. The diameter of the inclined surface 80 is slightly larger than an inner diameter of a rear end portion of the cup seal 46 and increases gradually in a rearward direction. A cylindrical surface 81 is formed rearwardly from the inclined surface 80. The cylindrical surface 81 has a uniform diameter regardless of the axial position. The fluid passage 32 opens in an end of the cylindrical surface 81 on a side of the inclined surface 80 and extends to slightly overlap with the inclined surface 80.

An annular recess 83 is formed on the outer circumferential surface of the secondary piston 13. In the initial state in which no input is supplied from the brake pedal to the secondary piston 13 and the secondary piston 13 is located at its initial position farthest away from the secondary pressure chamber 17, the recess 83 receives the inner lip portion 75 of the cup seal 46 in the free state. In this state, the outer lip portion 76 is in contact with a side wall of the large-diameter bore 69 under appropriate pressure.

The recess 83 comprises a first taper surface 84, a second taper surface 85 and a third taper surface (a control taper surface) 86. The first taper surface 84 is provided most closely to the front of the secondary piston 13 and is tapered so as to have a diameter decreasing in the rearward direction. The second taper surface 85 is continuous with a rear side of the first taper surface 84 and is tapered so as to have a diameter increasing in the rearward direction. The third taper surface 86 is continuous with a rear side of the second taper surface 85 and is tapered so as to have a diameter increasing in the rearward direction (decreasing toward the front of the secondary piston 13). The taper angle of the third taper surface 86 is larger than that of the second taper surface 85.

The first taper surface 84 at the initial position faces the chamfered surface 78 of the cup seal 46 in the initial state, such that the first taper surface 84 and the chamfered surface 78 overlap in the axial direction and are positioned substantially in parallel to each other in a slightly spaced relationship. It should be noted that a front end of the first taper surface 84 at the initial position is located toward the front of the cylinder 11 relative to a front end of the chamfered surface 78 of the cup seal 46.

The second taper surface 85 at the initial position faces the slide-contact surface 77 of the cup seal 46 in the initial state, such that the second taper surface 85 and the slide-contact surface 77 overlap in the axial direction and are positioned substantially in parallel to each other. It should be noted that a front end of the second taper surface 85 at the initial position is located toward the front of the cylinder 11 relative to a front end of the slide-contact surface 77 of the cup seal 46 and that a rear end of the second taper surface 85 at the initial position is located toward the rear of the cylinder 11 relative to a rear end of the slide-contact surface 77 of the cup seal 46.

A front end of the third taper surface 86 at the initial position is located at a position corresponding to an intermediate position in the axial direction on the inclined surface 80 of the second member 22. Further, a rear end of the third taper surface 86 at the initial position is located at a position corresponding to a point which is inside of the fluid passage 32 of the second member 22 in the axial direction. Thus, a rear end portion of the recess 83 overlaps the fluid supply chamber 34 in the axial direction.

A compression-sliding contact surface 87 is continuous with the rear end of the third taper surface 86. The compression-sliding contact surface 87 comprises the outer circumferential surface of the secondary piston 13 at a portion having the largest outer diameter, which is larger than the largest inner diameter of the slide-contact surface 77 of the inner lip portion 75 of the cup seal 46. The compression-sliding contact surface 87 is adapted to make sliding contact with the cup seal 46 while compressing the cup seal 46 to a certain degree. An opening 88 of the relief port 56 in the outer circumferential surface of the secondary piston 13 is placed in the second taper surface 85 and sized to extend to the boundary between the second taper surface 85 and the third taper surface 86.

Thus, the third taper surface 86 is capable of abutting against the rear end of the slide-contact surface 77 of the cup seal 46 at a position rearward from the opening 88 of the relief port 56. The opening 88 of the relief port 56 is formed in the recess 83. In the recess 83, the entire portion of the recess rearward from the opening 88 of the relief port 56 provides the third taper surface 86.

A front end of the relief port 56 of the secondary piston 13 at the initial position is located slightly closer to the front of the cylinder 11 than a rear end surface of the cup seal 46, and a rear end of the relief port 56 of the secondary piston 13 at the initial position is located toward the rear of the cylinder 11 relative to the rear end surface of the cup seal 46. That is, a front portion of the relief port 56 partially overlaps the cup seal 46 in the axial direction, and a rear portion of the relief port 56 is partially displaced from the cup seal 46 in the axial direction.

Next, an operation of the master cylinder 10 is explained. In the following explanation, the secondary piston 13 and elements associated therewith are taken as an example.

When the input applied to the brake pedal is boosted by the booster and inputted to the secondary piston 13 through the primary piston 12 and the initial clearance maintaining mechanism 14, the secondary piston 13 advances from the initial position in the cylinder 11, and the third taper surface 86 abuts against the rear end of the slide contact surface 77 of the cup seal 46.

Figure 3:
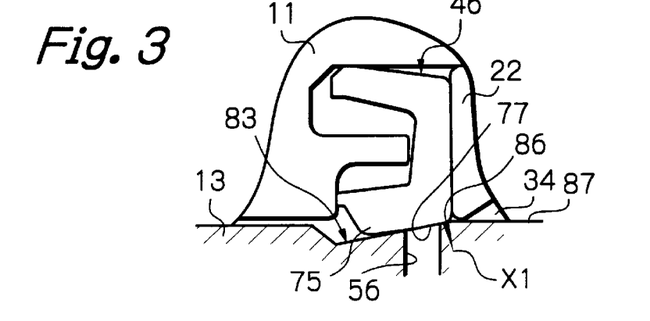
FIG. 3 is an enlarged cross-sectional view of the communication switching portion, showing a surface pressure distribution condition on a cup seal when a piston is advancing.

When the secondary piston 13 further advances, as shown in FIG. 3, the third taper surface 86 compresses the cup seal 46 to increase the diameter of the rear end of the slide-contact surface 77. The degree of compression (or tightness) of the cup seal 46 relative to the secondary piston 13 becomes locally high, so that a surface pressure between the cup seal 46 and the secondary piston 13 exhibits a peak (a surface pressure distribution with respect to the cup seal 46 and the secondary piston 13 in this state is indicated by X1 in FIG. 3). Consequently, the cup seal 46 prevents the secondary pressure chamber 17 from communicating with the fluid supply chamber 34 through the relief port 56, so that the brake fluid in the secondary pressure chamber 17 is pressurized by the secondary piston 13 to thereby generate the fluid pressure.

Figure 4:
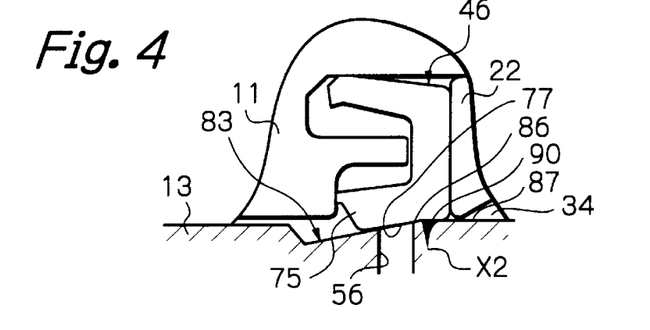
FIG. 4 is an enlarged cross-sectional view of the communication switching portion, showing another surface pressure distribution condition on the cup seal when the piston is advancing.

When the secondary piston 13 has reached a position such that, as shown in FIG. 4, the rear end portion of the cup seal 46 is positioned at a corner portion 90 on the boundary between the third taper surface 86 and the compression-sliding contact surface 87, the cup seal 46 is brought into line contact with the secondary piston 13 at the corner portion 90, and the surface pressure between the cup seal 46 and the secondary piston 13 peaks at the corner portion 90 (the surface pressure distribution in this state is indicated by X2 in FIG. 4). Therefore, the cup seal 46 continues preventing communication between the secondary pressure chamber 17 and the fluid supply chamber 34 through the relief port 56, so that the secondary piston 13 continues pressurizing the brake fluid in the secondary pressure chamber 17 to generate the fluid pressure.

Figure 5:
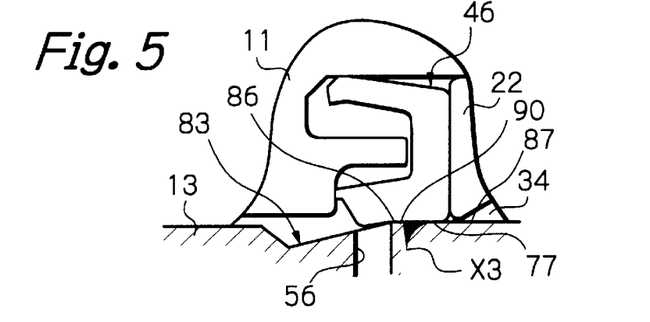
FIG. 5 is an enlarged cross-sectional view of the communication switching portion, showing a further surface pressure distribution condition on the cup seal when the piston is advancing.
Figure 6:
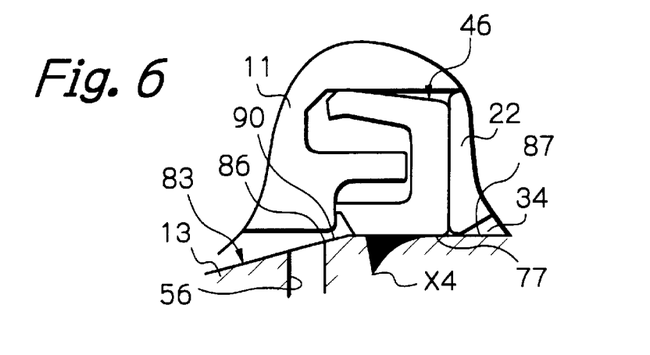
FIG. 6 is an enlarged cross-sectional view of the communication switching portion, showing a still further surface pressure distribution condition on the cup seal when the piston is advancing.

During further advancement of the secondary piston 13, as long as the cup seal 46 is in contact with the corner portion 90, as shown in FIG. 5, the peak of the surface pressure between the cup seal 46 and the secondary piston 13 exists at the corner portion 90 (the surface pressure distribution in this state is indicated by X3 in FIG. 5), so that the cup seal 46 continues preventing communication between the secondary pressure chamber 17 and the fluid supply chamber 34. When the secondary piston 13 has reached a position where the cup seal 46 as a whole is located on the compression-sliding contact surface 87, as shown in FIG. 6, the peak of the surface pressure shifts to a front portion of the cup seal 46 (the surface pressure distribution in this state is indicated by X4 in FIG. 6), and the cup seal 46 prevents communication between the secondary pressure chamber 17 and the fluid supply chamber 34 at the front portion of the cup seal 46 as in the conventional master cylinder.

Figure 2:
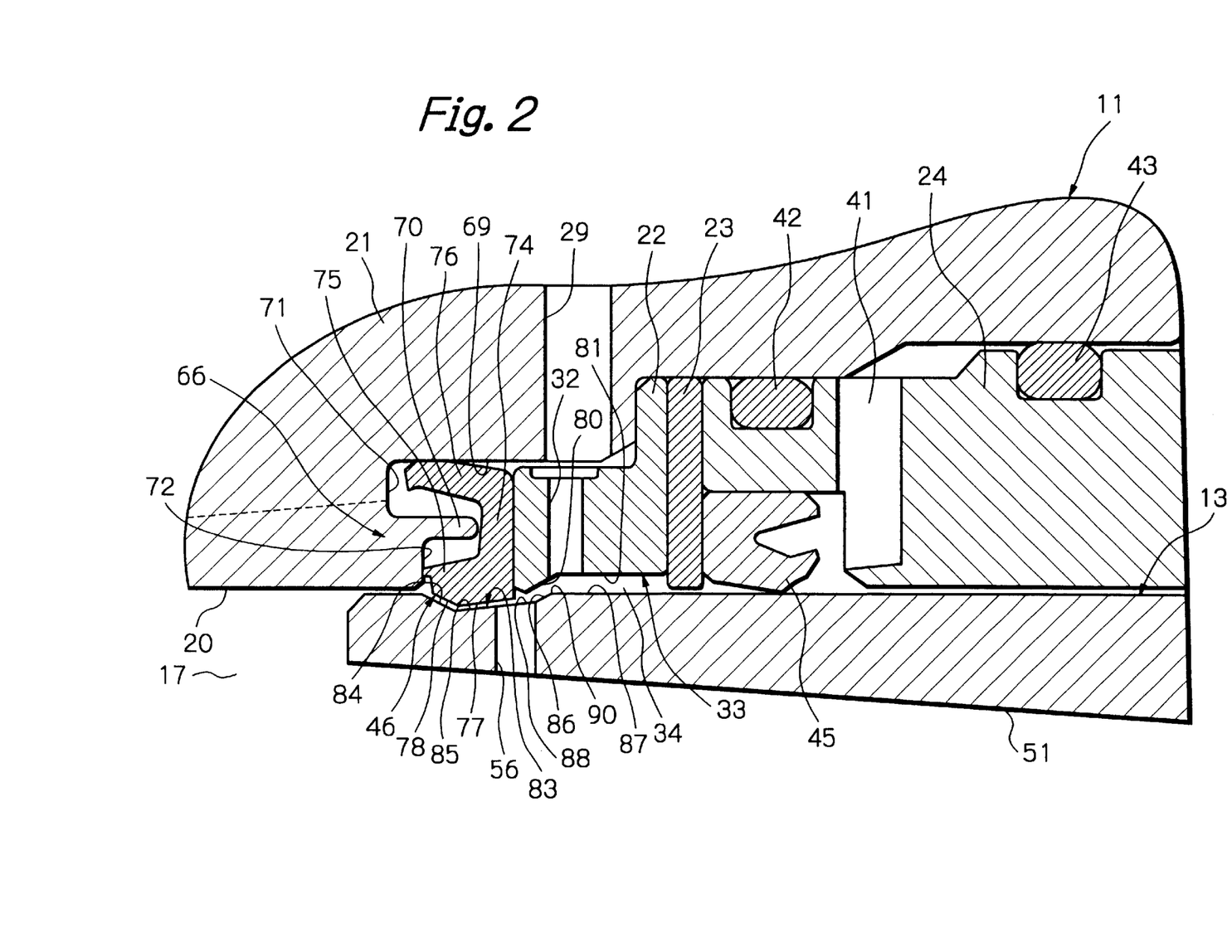
FIG. 2 is an enlarged cross-sectional view of a part of the master cylinder, showing a communication switching portion.

On the other hand, when the input applied to the brake pedal has been released, the secondary piston 13 returns to its initial position shown in FIG. 2. When the secondary piston 13 is located at the initial position and the brake fluid is positively suctioned through a pipe communicating with the secondary pressure chamber 17 for traction control, the brake fluid flows from the reservoir through the fluid passages 29 and 32, the fluid supply chamber 34 and the relief port 56.

As has been described above, since the third taper surface 86 tapered toward the front of the secondary piston 13 is formed on the outer circumferential surface of the secondary piston 13 rearwardly from the opening 88 of the relief port 56 so as to be capable of abutting against the inner circumferential surface of the cup seal 46, when the secondary piston 13 advances, the third taper surface 86 abuts against the rear end of the slide-contact surface 77 of the cup seal 46, so as to compress the cup seal 46 along the third taper surface 86 to increase the inner diameter of the cup seal 46. When the cup seal 46 is compressed at the rear end of the slide-contact surface 77, the surface pressure between the rear end portion of the cup seal 46 and the secondary piston 13 becomes locally high. Therefore, it has become possible to seal off the secondary pressure chamber 17 from the fluid supply chamber 34 by generating a sufficiently high surface pressure on the rear end portion of the cup seal 46 and pressurize, by means of the secondary piston 13, the brake fluid in the secondary pressure chamber 17 to thereby generate the fluid pressure. When the secondary piston 13 further advances, the peak of the surface pressure (indicated by X1, X2, X3 and X4) on the inner lip portion 75 of the cup seal 46 shifts from a rear end portion to a front end portion of the inner lip portion 75. Therefore, when the secondary piston 13 is located in its advanced position, sealing can be effected efficiently, so that the same brake fluid pressure as generated in the conventional master cylinder can be generated without lowering efficiency.

Since the sufficiently high pressure for sealing off the secondary pressure chamber 17 from the fluid supply chamber 34 can be generated by the third taper surface 86 on the rear end portion of the cup seal 46, it is sufficient only if the opening 88 of the relief port 56 is positioned in front of the third taper surface 86. Consequently, as shown in FIG. 7, the relief port 56 of the secondary piston 13 at the initial position can be positioned sufficiently rearwardly from the cup seal 46, while making the invalid stroke A less than that in the conventional master cylinder.

Figure 7:
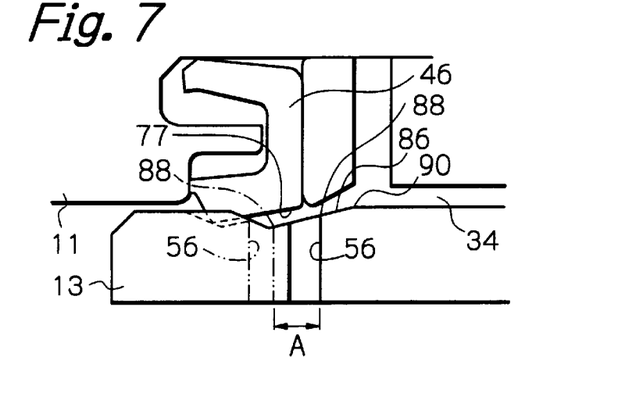
FIG. 7 is an enlarged cross-sectional view of the communication switching portion, showing a relationship between an invalid stroke of the piston and a relief port.

Namely, since the sufficiently high pressure for sealing off the secondary pressure chamber 17 from the fluid supply chamber 34 can be generated when the relief port 56 has moved relative to the cup seal 46 to a position indicated by two-dot chain lines in FIG. 7, the position of the relief port 56 indicated by solid lines in FIG. 7, which position is spaced away from the position indicated by the two-dot chain lines in FIG. 7 by a distance corresponding to the invalid stroke A, can be set sufficiently rearwardly from the cup seal 46, and this position can be set as the initial position of the relief port 56. Therefore, a sufficient degree of opening of the relief port 56 relative to the fluid supply chamber 34 (or the amount of communication therebetween) can be satisfactorily secured. Consequently, it is possible to flow the brake fluid in a sufficiently large amount from the reservoir through the fluid passages 29 and 32, the fluid supply chamber 34 and the relief port 56 without increasing the invalid stroke A. Therefore, the master cylinder 10 can be suitably used in combination with a brake control apparatus.

Further, since the relief port 56 of the secondary piston 13 at the initial position can be positioned sufficiently rearwardly from the cup seal 46, the amount of 26 communication between the secondary pressure chamber 17 and the fluid supply chamber 34 can be increased effectively by simply increasing the diameter of the relief port 56.

Further, since the third taper surface 86 is formed in the recess 83 rearwardly from the opening 88 of the relief port 56 and the rear end of the third taper surface 86 at the initial position overlaps the fluid supply chamber 34 in the axial direction, the cross-sectional area of a flow path in the fluid supply chamber 34 on a side of the relief port 56 is large, so that it is possible to flow the brake fluid in a sufficiently large amount from the reservoir through the fluid passages 29 and 32, the fluid supply chamber 34 and the relief port 56. Therefore, the master cylinder 10 can be suitably used in combination with a brake control apparatus.

Further, it is unnecessary to form the cup seal 46 into a special shape, so that reliability of the cup seal 46 can be secured.

When the secondary piston 13 advances from the initial position to a side of the secondary pressure chamber 17, the combination of the second taper surface 85 and the third taper surface 86 of the recess 83 moves relative to the cup seal 46 so that it gradually or successively increase an inner diameter of the cup seal 46. Therefore, the second taper surface 85 and the third taper surface 86 move while guiding the cup seal 46 so that it maintains its stable position, and thus, the invalid stroke can be stably effected.

When the secondary piston 13 is located at the initial position, the inner lip portion 75 of the cup seal 46 can be received in the recess 83 in the free state or while being compressed under pressure lower than that when the inner lip portion 75 is located on the compression-sliding contact surface 87. Therefore, the cup seal 46 is substantially in the free state when the secondary piston 13 is located at the initial position, so that fatigue of the cup seal 46 is unlikely to occur and hence, the life of the cup seal 46 can be prolonged.

The communication switching portion 66 is not limited to the above-mentioned embodiment and may have various structures, as long as the taper surface is formed rearwardly from the opening of the relief port 56 on the outer circumferential surface of the secondary piston 13.

Figure 8:
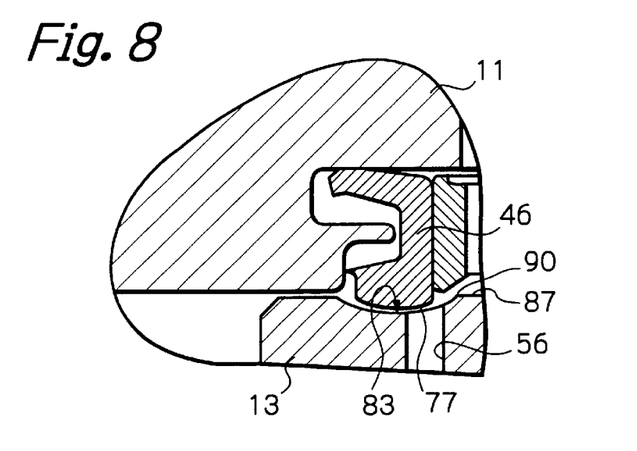
FIG. 8 is an enlarged cross-sectional view of a part of the master cylinder, showing another example of the communication switching portion.
Figure 9:
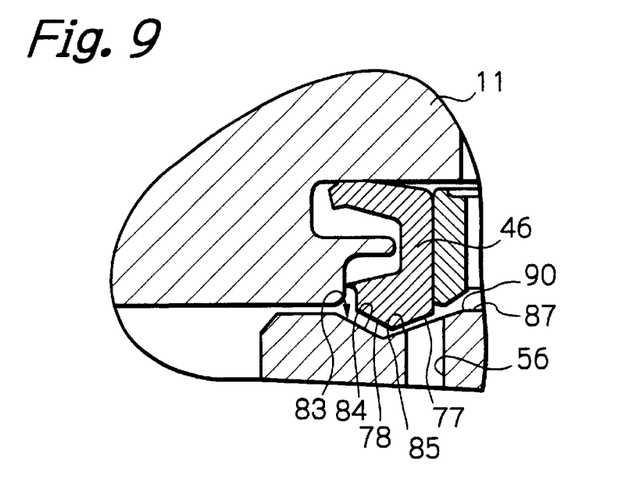
FIG. 9 is an enlarged cross-sectional view of a part of the master cylinder, showing a further example of the communication switching portion.
Figure 10:
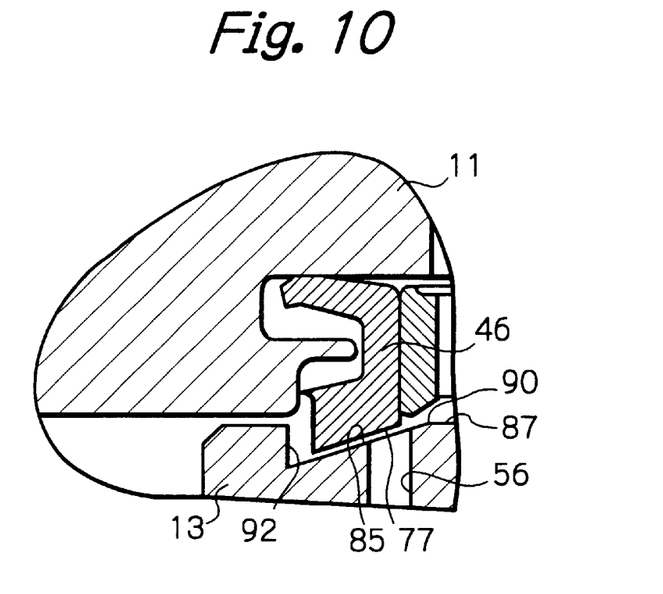
FIG. 10 is an enlarged cross-sectional view of a part of the master cylinder, showing a still further example of the communication switching portion.
Figure 11:
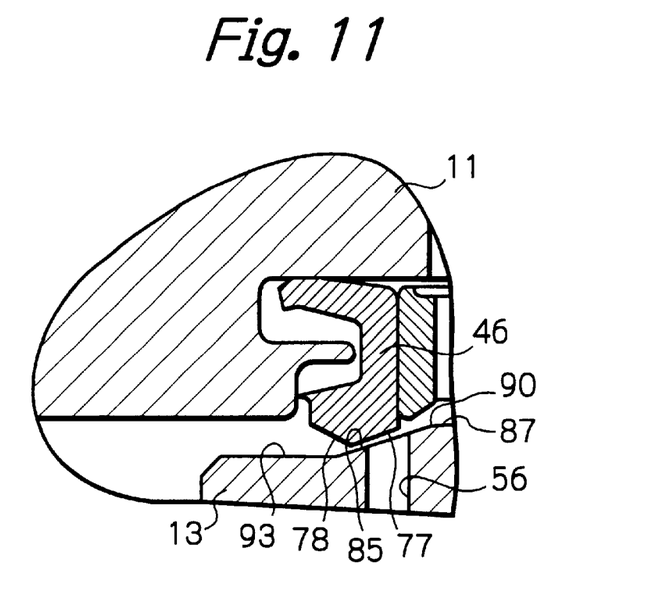
FIG. 11 is an enlarged cross-sectional view of a part of the master cylinder, showing a still further example of the communication switching portion.

FIGS. 8 to 11 illustrate modified examples of the communication switching portion 66. In FIG. 8, the recess 83 is formed to provide an arcuate cross-section taken on a plane containing the axis of the secondary piston 13 and the slide-contact surface 77 of the cup seal 46 forms a protrusion having an arcuate cross-section taken on a plane containing the axis of the cup seal 46, in conformity with the recess 83. In FIG. 9, the third taper surface 86 is eliminated and the second taper surface 85 is directly connected to the compression-sliding contact surface 87. In FIG. 10, the first taper surface 84 and the third taper surface 86 are eliminated, while the front end of the second taper surface 85 is directly connected to an end surface 92 perpendicular to the axis of the secondary piston 13 and the rear end of the second taper surface 85 is directly connected to the compression-sliding contact surface 87. Further, in FIG. 10, the chamfered surface 78 is eliminated from the inner circumferential surface of the cup seal 46, corresponding to the elimination of the first taper surface 84. In FIG. 11, the first taper surface 84 is eliminated and a cylindrical surface 93 is formed to extend straightly from the front end of the second taper surface 85 to a front end surface of the secondary piston 13, while the rear end of the second taper surface 85 is directly connected to the compression-sliding contact surface 87.

In the above-mentioned embodiment, the communication switching portion 66 on a side of the secondary piston 13 is taken as an example. It is to be understood that the communication switching portion 67 on a side of the primary piston 12 has the same structure as that of the communication switching portion 66 and therefore the same effect as that of the communication switching portion 66 is exerted by the communication switching portion 67.

As has been described above, in the master cylinder of the present invention, a control taper surface tapered toward the front of the piston is formed on the outer circumferential surface of the piston rearwardly from the opening of the relief port, so as to be capable of abutting against the inner circumferential surface of the cup seal. By this arrangement, when the piston advances, the control taper surface abuts against the inner circumferential surface of a rear end portion of the cup seal, so as to compress the cup seal along the control taper surface to increase an inner diameter of the cup seal. When the cup seal is compressed along the control taper surface, a surface pressure between the cup seal and the piston becomes locally high. Therefore, it has become possible to seal off the pressure chamber from the fluid supply chamber by generating a sufficiently high surface pressure on the rear end portion of the cup seal and pressurize, by means of the piston, a brake fluid in the pressure chamber to thereby generate the fluid pressure.

Since the sufficiently high pressure for sealing off the pressure chamber from the fluid supply chamber can be generated by the control taper surface on the rear end portion of the cup seal, it is sufficient only if the opening of the relief port on the outer circumferential surface of the piston is positioned in front of the control taper surface. Consequently, the relief port of the piston at its initial position can be positioned sufficiently rearwardly from the cup seal without increasing an invalid stroke of the piston, so that a sufficient degree of opening of the relief port relative to the fluid supply chamber (or the amount of communication therebetween) can be satisfactorily secured. Therefore, the master cylinder can be used suitably with a brake control apparatus without increasing the invalid stroke.

Further, since the relief port of the piston at the initial position can be positioned sufficiently rearwardly from the cup seal, the amount of communication between the pressure chamber and the fluid supply chamber can be increased effectively by increasing the diameter of the relief port.

Further, it is unnecessary to form the cup seal into a special shape, so that reliability of the cup seal can be secured.

In the master cylinder of the present invention, a recess may be formed on the outer circumferential surface of the piston so that the opening of the relief port on the outer circumferential surface of the piston is formed in the recess and the control taper surface is formed in the recess rearwardly from the opening of the relief port. By this arrangement, the cross-sectional area of a flow path in the fluid supply chamber on a side of the relief port can be made large, so that it is possible to flow the brake fluid in a sufficiently large amount from the fluid supply chamber to the relief port. Therefore, the master cylinder can be more suitably used in combination with a brake control apparatus.

What is claimed is:

1. A master cylinder comprising:

a cylinder;

a piston slidably provided in the cylinder, the piston and the cylinder defining a pressure chamber for generating a fluid pressure in front of the piston, the cylinder and an outer circumferential surface of the piston defining a fluid supply chamber which communicates with a reservoir;

an annular cup seal held on an inner circumferential surface of the cylinder, the cup seal being adapted to slide against the outer circumferential surface of the piston to separate the fluid supply chamber from the pressure chamber; and a relief port formed in the piston, the relief port having opposite openings, one of the openings being open in the outer circumferential surface of the piston and the other opening being always open to the pressure chamber, so as to be capable of providing communication between the pressure chamber and the fluid supply chamber, wherein the piston has a smaller-diameter portion and a forwardly facing control taper surface positioned rearwardly of the opening of the relief port in the outer circumferential surface of the piston and connecting to the smaller-diameter portion, and the cup seal is positioned so that an inner peripheral portion thereof resides over the smaller-diameter portion when the piston is in a rest position, and the cup seal is sized so that the diameter of the inner circumferential surface of the cup seal at the rear end thereof is smaller than the diameter of the control taper at the rear end of the taper.

2. A master cylinder according to claim 1, wherein the smaller-diameter portion is a recess, the opening of the relief port in the outer circumferential surface of the piston is formed in the recess, and the control taper surface is formed in the recess rearwardly from the opening of the relief port.

3. A master cylinder according to claim 1, wherein the piston has a compression-sliding contact surface having such a diameter that when the cup seal slides on the compression-sliding contact surface, the cup seal is compressed, and wherein the control taper surface connects to the compression-sliding contact surface.

4. A master cylinder according to claim 3, wherein a second taper surface having a diameter decreasing toward the front of the piston is provided in front of the control taper surface so that the second taper surface connects to the control taper surface, and the degree of taper of the control taper surface is greater than that of the second taper surface.

5. A master cylinder according to claim 4, wherein the relief port opening, which is open in the outer circumferential surface of the piston, is formed in the second taper surface.

6. A master cylinder according to claim 2, wherein the cup seal has a contour which is generally complementary to that of the recess.

7. A master cylinder according to claim 6, wherein the recess is formed by a plurality of taper surfaces and the rearmost one of the taper surfaces constitutes the control taper surface.

8. A master cylinder according to claim 6, wherein the recess has an arcuate cross-sectional configuration in a plane extending through a center axis of the piston.

9. A master cylinder according to claim 2, wherein the piston has a compression-sliding contact surface having such a diameter that when the cup seal slides on the compression-sliding contact surface, the cup seal is compressed, and wherein the control taper surface connects to the compression-sliding contact surface.

* * * * *